US008638888B2

(12) United States Patent  
Hambeck et al.

(10) Patent No.: US 8,638,888 B2  
(45) Date of Patent: Jan. 28, 2014

(54) ANALOG CORRELATION TECHNIQUE FOR ULTRA LOW POWER RECEIVERS

(75) Inventors: Christian Hambeck, Gerersdorf (AT); Stefan Mahlknecht, Vienna (AT); Thomas Herndl, Biedermannsdorf (AT); Franz Darrer, Graz (AT); Jakob Jongsma, Graz (AT)

(73) Assignee: Infineon Technologies AG, Neubiberg (DE)

( * ) Notice: Subject to any disclaimer, the term of this patent is extended or adjusted under 35 U.S.C. 154(b) by 158 days.

(21) Appl. No.: 13/187,855

(22) Filed: Jul. 21, 2011

(65) Prior Publication Data

US 2013/0022154 A1   Jan. 24, 2013

(51) Int. Cl.  
*H03D 1/00*  (2006.01)

(52) U.S. Cl.  
USPC ........... 375/343; 375/130; 375/142; 375/143; 375/150; 375/152; 375/208; 375/316; 375/239; 375/345; 375/350; 708/313; 708/300; 708/422; 455/131; 327/175

(58) Field of Classification Search  
USPC ............. 375/1, 130, 142, 143, 150, 152, 208, 375/239, 316, 343, 345, 350, 367; 708/313; 708/300, 422; 455/131; 327/175  
See application file for complete search history.

(56) References Cited

U.S. PATENT DOCUMENTS

| 5,022,047 | A | * | 6/1991 | Dixon et al. | 375/151 |
| 5,432,814 | A | * | 7/1995 | Hasegawa | 375/133 |
| 5,574,754 | A | * | 11/1996 | Kurihara et al. | 375/367 |
| 5,600,328 | A | * | 2/1997 | Tachita et al. | 342/357.62 |
| 6,081,548 | A | * | 6/2000 | Saito | 375/130 |
| 6,166,676 | A | * | 12/2000 | Iizuka | 341/172 |
| 6,275,478 | B1 | | 8/2001 | Tiedemann, Jr. | |
| 6,330,274 | B1 | * | 12/2001 | Uehara | 375/150 |
| 6,590,888 | B1 | * | 7/2003 | Ohshima | 370/342 |
| 6,839,389 | B2 | * | 1/2005 | Mehrnia et al. | 375/328 |
| 7,280,615 | B2 | * | 10/2007 | Roberts | 375/316 |
| 7,286,499 | B2 | | 10/2007 | Tiedemann, Jr. | |

(Continued)

FOREIGN PATENT DOCUMENTS

EP   2222124 A1   8/2010  
EP   2257110 A1   12/2010

OTHER PUBLICATIONS

Marco Spinola Durante et al. "An Ultra low power Wakeup Receiver for Wireless Sensor Nodes", 2009, IEEE, total of 4 pages.*

(Continued)

*Primary Examiner* — Sam K Ahn  
*Assistant Examiner* — Fabricio R Murillo Garcia  
(74) *Attorney, Agent, or Firm* — Eschweiler & Associates, LLC (57) ABSTRACT

One embodiment of the present invention relates to an analog correlation unit comprising a plurality of parallel correlation components configured to operating according to an advanced switched-capacitor low pass filter principle that increases coding gain of the unit. Each correlation component comprises a sampling stage and a correlation stage. The sampling stage may comprise a switched capacitor configured to sample a received baseband signal to determine a value (e.g., polarity) of the baseband signal. The sampled baseband signal is provided to the correlation stages, which may respectively comprise a plurality of switched integrators configured to selectively receive and integrate the sampled baseband signal over time depending upon values (e.g., polarity) of the correlation code to generate voltage potential values. The analog correlation result is evaluated by a comparison of an adjustable threshold voltage with the difference between the output voltage potential values.

20 Claims, 5 Drawing Sheets

(56) References Cited

U.S. PATENT DOCUMENTS

| | | | |
|---|---|---|---|
| 7,447,254 B1* | 11/2008 | Mack et al. | 375/146 |
| 7,756,194 B1* | 7/2010 | O'Connor et al. | 375/150 |
| 2001/0017848 A1 | 8/2001 | Tiedemann, Jr. | |
| 2002/0177421 A1* | 11/2002 | Muhammad et al. | 455/131 |
| 2010/0109731 A1* | 5/2010 | Ko et al. | 327/175 |
| 2010/0316174 A1* | 12/2010 | Lee et al. | 375/345 |

OTHER PUBLICATIONS

Daily, Denis C., et al. "An Energy-Efficient OOK Transceiver for Wireless Sensor Networks." IEEE Journal of Solid-State Circuits, vol. 42, No. 5, May 2007. 9 Pages.

Durante, Marco Spinola, et al. "An Ultra Low Power Wakeup Receiver for Wireless Sensor Nodes." Institute of Computer Terchnology, Vienna, Austria. 4 Pages.

Carmo, J.P., et al. "A 2.4-GHz RF CMOS transceiver for wireless sensor applications." 4 Pages.

www.wikipedia.org "Code Division Multiple Access." 7 Pages.

CHOSeN "Cooperative Hybrid Objects Sensor Networks." EU Project Concertation Meeting, Jun. 2 Braunschweig Germany. 27 Pages.

Pettersen, Staale. "Reducing current consumption and cost with 902-928 MHz spread spectrum ASK modulation." Jun. 1, 2006. 4 Pages.

Hovem, Jens Martin, et al. "SENSORCOMM 2009. The Third International Conference on Sensor Technologies and Applications." Jun. 18-23, 2009 Athens Greece. 16 Pages.

* cited by examiner

ANALOG CORRELATION TECHNIQUE FOR ULTRA LOW POWER RECEIVERS

BACKGROUND OF THE INVENTION

Spread-spectrum techniques are widely used in many modern day communication technologies (e.g., CDMA). Such techniques allow a signal to be spread over a large frequency, such that the signal's frequency bandwidth is increased (i.e., "spread" in the frequency domain). For example, direct sequence spread-spectrum operates to spread a digital radio frequency (RF) carrier signal's bandwidth by multiplying (i.e., modulating) digital data being transmitted by a pseudorandom sequence of digital values (e.g., "1" and "−1") generated by a pseudorandom sequence generator. Multiplication of the digital data at a frequency much higher than that of the original carrier signal spreads the energy of the original carrier signal into a much wider frequency bandwidth. Such higher bandwidths allow for multiple signals to be transmitted at the same time, wherein each signal uses a different pseudorandom sequence.

To synchronize the digital transmission operations between a receiver and a transmitter a correlation unit may be used to recover data from a received signal (i.e., to determine whether a logic "1" or "0" was received). The correlation unit reconstructs (i.e., "de-spreads") the original date, at the receiving end, by multiplying it by the same pseudorandom sequence of digital values. If the received signal matches the receiver's pseudorandom sequence then the correlation function is high and the system can extract that signal. If the receiver's pseudorandom sequence has nothing in common with the received signal, the correlation function is low (thus eliminating the signal). For example, a receiver may correlate a received signal with a known pseudorandom sequence generated by its own sequence generator. When a large positive correlation results between the received signal and the pseudorandom sequences, a "1" is detected, while when a large negative correlation results, a "0" is detected.

BRIEF DESCRIPTION OF THE DRAWINGS

FIG. 3b shows timing diagrams illustrating an exemplary correlation code sequence, the logical behaviour of the matched filter, and corresponding integration switch control signals of the ultra low power correlation unit of FIG. 3a.

FIG. 5b illustrates a graph showing a comparison of the correlation unit output against an activation threshold for the wake up receiver of FIG. 5a.

DETAILED DESCRIPTION OF THE INVENTION

The present invention will now be described with reference to the attached drawing figures, wherein like reference numerals are used to refer to like elements throughout, and wherein the illustrated structures and devices are not necessarily drawn to scale.

Some aspects of the present disclosure provide for an analog correlation unit configured to operate within an analog domain based upon a switched integrator principle. In one embodiment, the correlation unit comprises a plurality of parallel correlation components, respectively configured to perform a parallel evaluation of a received baseband signal based upon a bit-shifted version of a correlation code sequence provided by a shift register. Each correlation component comprises a sampling stage and a correlation stage. In one embodiment, the sampling stage may comprise a switched capacitor configured to sample the received baseband signal. A samples is provided to one of a plurality of switched integrators (e.g., a first switched integration capacitor and a second switched integration capacitor) within each correlation stage during each sampling clock period, depending upon a value (e.g., polarity) of the bit-shifted correlation code sequence. The switched integrators are configured to integrate a plurality of baseband signal samples over a plurality of sampling clock periods, such that the operating principle of the correlation unit is based on an advanced switched-capacitor low pass filter structure, which increases coding gain of the unit. The accumulated output of the switched integrators is provided to a comparison unit, configured to generate a correlated output signal based upon the voltages output from the plurality of switched integrators.

In contrast to existing COMA correlation networks, the proposed correlation method and apparatus do not affect radio frequency (RF) modulation, but instead operate upon a receiver's baseband signal in order to reduce its noise bandwidth and therefore exploit coding gain for enhancement of signal-to-noise ratio (SNR). This technique has high potential for low power consumption because signal processing is done in low frequency baseband domain.

Figure 1:
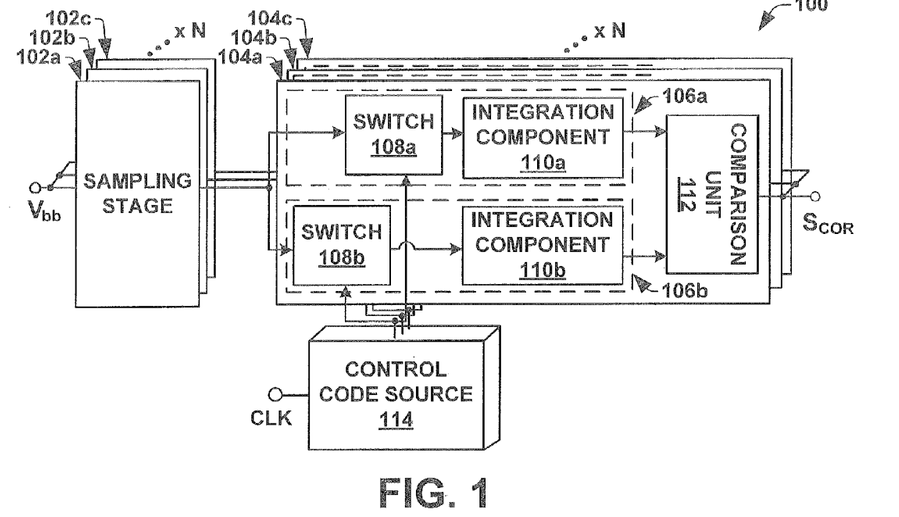
FIG. 1 illustrates a block diagram of a first embodiment of an ultra low power correlation unit.

FIG. 1 illustrates a block diagram of a first embodiment of an ultra low power correlation unit 100, as provided herein. As illustrated in FIG. 1, the correlation unit 100 comprises a plurality of N parallel correlation components, respectively configured to perform correlation of a received baseband signal $V_{bb}$ to generate a correlated output signal $S_{COR}$ having a reduced noise bandwidth.

Each parallel correlation component comprises a sampling stage 102x (where x=a, b, c, . . . ) located upstream of a correlation stage 104x (where x=a, b, c, . . . ). The sampling stage 102x is configured to sample a received analog baseband signal $V_{bb}$ in the time domain. The correlation stage 104x comprises one or more switched integrators configured to selectively receive and integrate the sample of the baseband signal. In one embodiment, the correlation stage 104x may comprise a first switched integrator 106a having a first switch 108a coupled to a first integration component 110a (e.g., sampling capacitor) and a second switched integrator 106b having a second switch 108b coupled to a second integration component 110b (e.g., sampling capacitor). The first and second integration components, 110a and 110b, are configured to integrate a plurality of baseband signal samples (e.g., low pass filter time constant of 700 samples) over time (e.g., a plurality of sampling clock periods) resulting in first and second integrated (i.e., accumulated) voltage values. A comparison unit 112, located downstream of switched integrators 106a and 106b, is configured to receive and evaluate the first and second integrated voltage values to evaluate an analog correlation result from which a digital correlated output signal SCOR may be generated.

A control code source 114 (e.g., shift register) may be configured to store a predetermined correlation code sequence, which controls operation of switches within the plurality of correlation stages 104x. For example, during operation, sampling stage 102x is configured to sample the baseband signal $V_{bb}$ at a particular sampling clock period. The baseband signal sample is then provided to either the first or second switched integrator, 106a or 106b, depending upon the value of the correlation code sequence provided from the control code source 114 to a correlation stage 104x during that sampling clock period (e.g., if correlation code has a first code pattern weight, then switch 108a is operated to provide the sampled charge of the baseband signal to the first integration component 110a, while if the correlation code has a second code pattern weight switch 108b is operated to provide the sampled charge to the second integration component 110b). The sampling may be repeated over a plurality of sampling clock periods to build voltage potentials at the integration components. The built-up voltages output from the integration components (e.g., capacitors) are evaluated by the comparison unit 112 to evaluate the analog correlation result from which the digital correlated output signal $S_{COR}$ may be generated.

In one embodiment, the control code source 114 is configured to generate a plurality of bit-shifted versions of the correlation code sequence, which respectively control operation of each parallel correlation component. This allows for the plurality of parallel correlation components to perform a parallel evaluation the baseband signal based upon the bit-shifted correlation code sequences.

Figure 2:
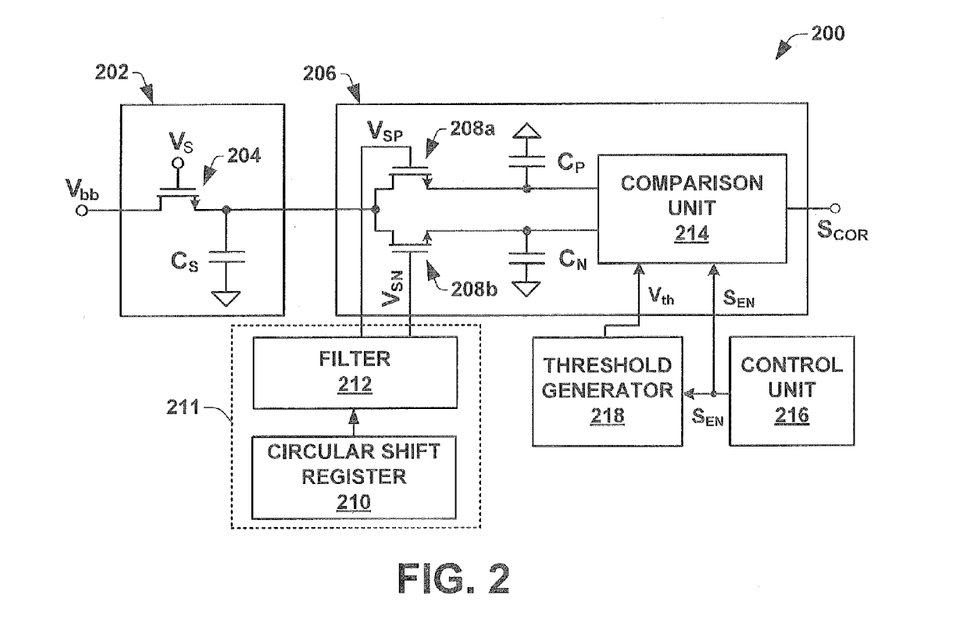
FIG. 2 illustrates a more detailed embodiment of a correlation component of an ultra low power correlation unit as provided herein.

FIG. 2 illustrates a more detailed embodiment of a correlation component within an ultra low power correlation unit 200, as provided herein (e.g., corresponding to correlation unit 100). As illustrated in FIG. 2, correlation unit 200 comprises a sampling stage 202 having a transistor device 204 that is operated according to a sampling signal $V_S$ (e.g., a periodic clock signal) coupled to the gate of the device. The sampling stage 202 is configured to selectively sample the baseband signal $V_{bb}$ in time by storing a sampled charge of the baseband signal $V_{bb}$ in a sampling capacitor $C_S$ when the transistor device 204 is turned on (e.g., when $V_S$ is high). In one embodiment, the transistor device 204 may comprise a standard MOSFET device implemented in CMOS technology. In an alternative embodiment, the transistor device 204 may comprise a dual gate oxide 10-transistor and the sampling capacitor $C_S$ may comprise a metal-insulator-metal capacitor, for example.

The control code source 211 comprises a circular shift register 210 and a matched filter 212. The circular shift register 210 is configured to store a predetermined correlation code sequence. In one embodiment, the correlation unit is configured to perform correlation of the received baseband signal by generating control signals, $V_{SN}$ and $V_{SP}$, based upon an oversampled correlation code generated by matched filter 212, for anti-aliasing in analog time domain sampling that has multiple values or polarities (e.g., +1, −1, and 0). For example, the correlation code sequence may be filtered by matched filter 212 to generate an oversampled correlation code having proper signal weighting to achieve matched characteristics when compared to the baseband signal $V_{bb}$. The matched filter 212 then generates control signals, $V_{SN}$ and $V_{SP}$, from the oversampled correlation code.

Control signals $V_{SP}$ and $V_{SN}$ are provided to the gates of transistor devices 208a and 208b comprised within the correlation stage 206 to selectively operate the devices during a sampling clock period. In one embodiment, if the oversampled correlation code has a first code pattern weight (e.g., +1), control signal $V_{SP}$ will be set to a high value that turns on transistor 208a (providing the sampled charge of the baseband signal to capacitor $C_P$), while control signal $V_{SN}$ will be set to a low value that turns off transistor 208b. Therefore, the first oversampled correlation code value causes the sampled charge (stored in sampling capacitor $C_S$) to be transferred from the sample capacitor $C_S$ to the first integration capacitor $C_P$. If the oversampled correlation code has a second code pattern weight (e.g., −1), control signal $V_{SP}$ will be set to a low value that turns off transistor 208a, while control signal $V_{SN}$ will be set to a high value that turns on transistor 208b (providing the sampled charge to capacitor $C_N$). Therefore, the second oversampled correlation code value causes sampled charge to be transferred from the sampling capacitor $C_S$ to the second integration capacitor $C_N$. If the oversampled correlation code has a third code pattern weight (e.g., 0), then both control signals $V_{SN}$ and $V_{SP}$ are set to a low value that turns off transistors 208a and 208b (providing the sampled charge to neither capacitor $C_P$ or $C_N$).

A comparison unit 214 is configured to receive and evaluate integrated voltage potentials output from integration capacitors $C_P$ and $C_N$ to evaluate an analog correlation result from which a correlated output signal $S_{COR}$ is generated. In one embodiment the correlation output signal is generated based upon the difference between the positive and negative integrated voltage potentials accumulated over a plurality of sampling clock periods in integration capacitors $C_N$ and $C_P$.

In one embodiment, a control unit 216 may be configured to generate an enable signal $S_{EN}$ that activates a threshold generator 218 and the comparison unit 214 at a low duty cycle in order to reduce power consumption of the comparison unit 214 and the threshold generator 218. This is possible without aliasing effect because of the reduced signal bandwidth of the voltage potentials at the integration capacitors $C_P$ and $C_N$. The threshold generator 218 is configured to generate one or more voltage threshold values $V_{th}$, which are provided to the comparison unit 214. In one embodiment, if the voltage difference between the outputs of integration capacitors $C_P$ and $C_N$ is greater than the threshold value $V_{th}$ then the correlated output signal $S_{COR}$ is high, while if the voltage difference between the outputs of integration capacitors $C_P$ and $C_N$ is less than the threshold value $V_{th}$ then the correlated output signal $S_{COR}$ is low.

In one embodiment, the ratio of the integration capacitors $C_P$ and $C_N$ to the sampling capacitor $C_S$ may be high. This provides for a high, low pass filter time constant that allows a large number of baseband signal samples to be averaged/accumulated, thereby reducing power consumption by lowering the output bandwidth at the integration capacitors and allowing the output of the correlation unit to be duty cycled heavily (e.g., allowing the output to be evaluated once per M clock cycles). In general, the ratio of the first and second integration capacitors $C_P$ and $C_N$ to sampling capacitor $C_S$ may be set greater than or equal to the length of the actual correlation code sequence used (e.g., predetermined correlation code sequence length, bit-shifted correlation code). For example, in one embodiment the ratio of the first and second integration capacitors $C_P$ and $C_N$ to sampling capacitor $C_S$ is greater than 300 (i.e., $C_P/C_S>300$, $C_P/C_S>300$), thereby allowing 300 bits to be averaged/accumulated by the integration capacitors before the output of the correlation unit is evaluated. In another more preferred embodiment, the ratio of the first and second integration capacitors $C_P$ and $C_N$ to sampling capacitor $C_S$ may be greater than 700 (i.e., $C_P/C_S>700$, $C_N/C_S>700$), thereby allowing 700 bits to be averaged/accumulated in the integration capacitors before the output is evaluated.

Figure 3A:
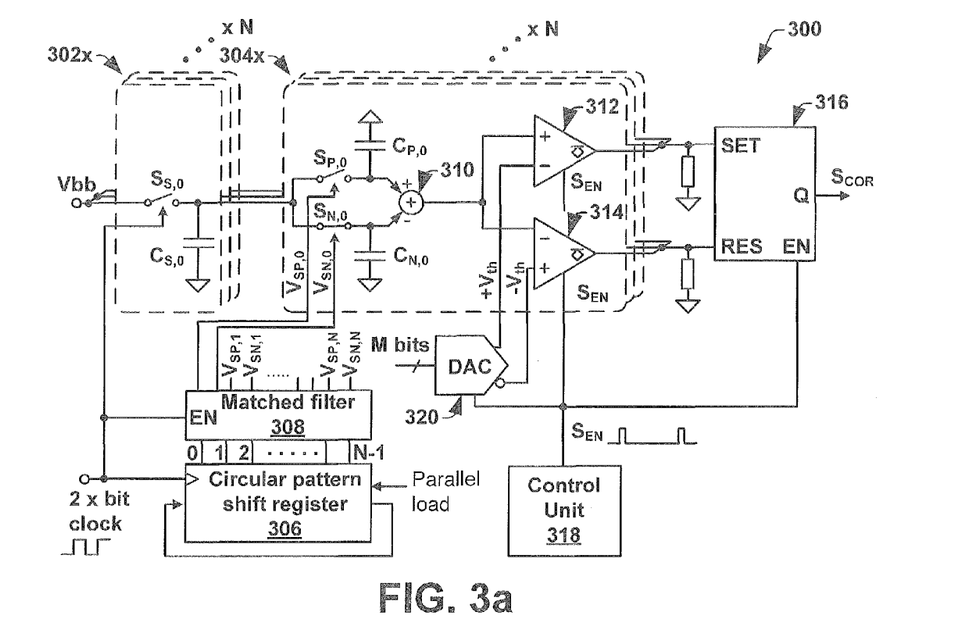
FIG. 3a illustrates a more detailed embodiment of an ultra low power correlation unit.

FIG. 3a illustrates a more detailed embodiment of an ultra low power correlation unit 300, as provided herein. As illustrated in FIG. 3a, the correlation unit 300 comprises N parallel correlation components and a single circular pattern shift register 306 that contains the correlation code sequence (e.g., a digital 1-bit code sequence). Each correlation component comprises a sampling stage 302x having a switch $S_{S,0}$ configured to selectively provide a baseband voltage $V_{bb}$ to a sampling capacitor $C_{S,0}$. The sampling capacitor $C_{S,0}$ is configured to sample the baseband signal $V_{bb}$ by storing a charge when the switch $S_{S,0}$ is turned on. In one embodiment, the switch $S_{S,0}$ is operated by a continuous clock input (2× bit clock). If the clock input is high, the switch $S_{S,0}$ is closed and the input baseband voltage $V_{bb}$ is sampled in the sampling capacitor $C_{S,0}$. If the clock input is low, the switch $S_{S,0}$ is opened preventing the input baseband voltage $V_{bb}$ from reaching sampling capacitor $C_{S,0}$.

A circular pattern shift register 306 is configured to store a digital correlation code sequence. In one embodiment, a matched filter 308 is configured to filter the correlation code sequence, output from the circular pattern shift register 306, to generate an oversampled digital pattern (oversampled correlation code) having an output weight that matches the baseband signal $V_{bb}$ (i.e., in order to achieve matched characteristic when compared to the baseband signal). Control signals ($V_{SP,0}$, $V_{SN,0}$, $V_{SP,1}$, $V_{SN,1}$, etc.) for all N correlation stages 304x may be generated from the oversampled correlation code via a single shift register 306, and are provided to switches ($S_{P,0}$, $S_{N,0}$, etc.) within each of the correlation stages 304x.

Since the correlation unit does not add any synchronization information to correlation code sequence, correlation is performed in parallel by the N correlation components (e.g., cumulatively performing the correlation N times), wherein each correlation component is operated by control signals generated from a bit-shifted version of the correlation code sequence. In one embodiment, the bit-shifted version of the correlation code sequence may generated based upon the input clock signal (e.g., a predefined code sequence, parallely loaded into the circular pattern shift register, is shifted with the input clock to generate a plurality of bit-shifted correlation code sequences), so that each of the plurality of parallel correlation components is respectively configured to perform a parallel evaluation of a bit-shifted version of the correlation code sequence.

As illustrated in FIG. 3a, the circular pattern shift register 306 and matched filter 308 comprise a plurality of taps configured to provide control signals ($V_{SP,0}$, $V_{SN,0}$, $V_{SP,1}$, $V_{SN,1}$, ...) for switches in the plurality of N correlation stages 304x. The use of a single circular pattern shift register 306 and matched filter 308 with a plurality of taps allows the correlation unit to be operated at ultra low power since power consumption is limited to the shift register 306, the matched filter 308, and components used to evaluate the correlation signal output (312, 314, and 316).

Figure 3B:
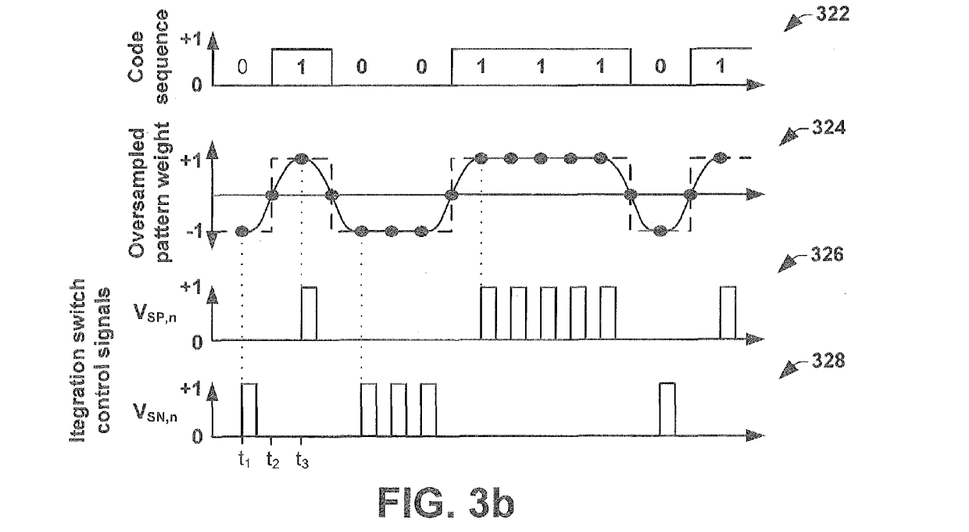

FIG. 3b shows exemplary timing diagrams illustrating a correlation code sequence, an oversampled correlation code, and control signals corresponding to ultra low power correlation unit 300. As shown in FIG. 3b, the correlation code sequence, illustrated in graph 322, may comprise a sequence of logical "0's" and "1's". The oversampled correlation code has an oversampled pattern, illustrated in 324, with oversampled output pattern weights of +1, −1, and 0 (e.g., −1 if the code sequence is 0, 0 at bit transitions of the code sequence, and +1 if the code sequence is 1). The filtered pattern corresponds to control signals, illustrated in graphs 326 and 328, which selectively operate switches within the correlation stages.

During a first sampling clock period $t_1$, when the correlation code sequence is "0", the oversampled correlation code has a pattern weight of "−1", resulting in control signals that cause switch $V_{SN,n}$ to be closed and switch $V_{SP,n}$ to be open. During a second sampling clock period $t_2$, when the code sequence transitions from "0" to "1", the oversampled correlation code has a pattern weight of "0", resulting in control signals that cause both switches $V_{SN,n}$ and $V_{SP,n}$ to be open. During a third sampling clock period se $t_3$, when the code sequence is "1", the oversampled correlation code has a pattern weight of "+1", resulting in control signals that cause switch $V_{SN,n}$ to be open and switch $V_{SP,n}$ to be closed. In subsequent sampling clock period, the operational features illustrated in sampling clock periods $t_1$-$t_3$ are repeated.

Referring to FIG. 3a, in one embodiment, the circular pattern shift register 306 may be configured to periodically provide control signals based upon a particular oversampled correlation code to a plurality of correlation stages, during a single sampling clock period. This allows for a smaller correlation code sequence to be used with a greater number of correlation stages (i.e., allows for operation of a number of correlation stages which is larger than the length of the correlation code sequence). For example, this allows for a 64-bit correlation code to be used with 128 stages of correlation.

Furthermore, the circular pattern shift register 306 may be configured to periodically provide control signals generated from a particular bit-shifted correlation code sequence to a particular correlation stage, between evaluations (e.g., comparisons) of voltage potentials stored in integration capacitors $C_N$ and $C_P$ by a comparison unit (e.g., over a plurality of sampling clock periods). This allows a large number of baseband signals to be accumulated at the switched integrators and increases coding gain. For example, if the 64-bit correlation code is transmitted twice consecutively between evaluations and the ratio of integration capacitance to sampling capacitance is more than 128 (e.g., $C_{P,0}/C_{S,0}$>128, $C_{N,0}/C_{S,0}$>128), then coding gain of more than 128 may be achieved, thereby reducing noise power (noise amplitude is reduced by square root of 128).

A summation node 310 (e.g., adder/subtractor) is coupled to the output of integration capacitor $C_{P,0}$ and the output of integration capacitor $C_{N,0}$. The summation node 310 is configured to generate a voltage difference between the outputs of the integration capacitors. For example, as shown in FIG. 3a, a positive voltage from capacitor $C_{P,0}$ and a negative voltage from capacitor $C_{N,0}$ is provided to a summation node 310 comprising an adder, which is configured to generate a voltage difference therefrom. The voltage difference is provided to a first comparator 312 and a second comparator 314.

The first comparator 312 is configured to receive the output of the summation node 310 (i.e., the voltage difference between integration capacitor $C_{P,0}$ and integration capacitor $C_{N,0}$) and compare it to a first, positive threshold voltage +$V_{th}$ generated by a digital-to-analog converter (DAC) 320. In particular, the first comparator 312 has a first input node (non-inverting input node) coupled to the output of the summation node 310 and a second input node (inverting input node) coupled to a positive threshold value +$V_{th}$. If the first input node is at a higher voltage than the second input node, the output of the comparator 312 is high. If the first input node is at a lower voltage than the second input node the output of comparator 312 is low (e.g., $V_{out}=C(V_{in}-V_{in})$).

The second comparator 314 is configured to receive the output of the summation node 310 (i.e., the voltage difference between integration capacitor $C_{P,0}$ and integration capacitor $C_{N,0}$) and compare it to a second, negative threshold voltage $-V_{th}$ generated by a digital-to-analog converter (DAC) 320. In particular, the second comparator 314 has a first input node coupled to the output of the summation node 310 and a second input node coupled to a negative threshold value $-V_{th}$.

In one embodiment, a control unit 318 may be configured to generate an enable signal $S_{EN}$ that operates an RS latch and DAC 320 at a low duty cycle in order to further reduce power of the result evaluation circuit containing comparators 312 and 314, and DAC 320. The RS latch 316 is configured to receive the wired-OR connected outputs of comparators 312x and comparators 314x, and to operate based upon the enable signal $S_{EN}$ to generate the correlated output signal $S_{COR}$. If the enable $S_{EN}$ is high, the latch is transparent and the actual digital result is presented at the output. If $S_{EN}$ is low, the latch is closed and the latch remains in the state it was at the last time $S_{EN}$ was high.

For example, if enabled, the wired-OR connected open drain output of the comparators 312x is active as long as at least one correlation result of the N parallel correlation stages 304x exceeds the positive decision threshold $+V_{th}$ (i.e., is greater than $+V_{th}$). Then, the output of the RS latch 316 is set. Alternatively, when the wired-OR connected output of comparators 314x indicates an undershoot of the negative comparison threshold $-V_{th}$ (i.e., at least one correlation result of the N parallel correlation stages 304x is less than $-V_{th}$) in any of the N correlation stages, the RS latch is reset. This Schmitt trigger functionality sets and resets the data output $S_{COR}$ according to sufficient signal strength depending on polarity of the analog correlation result. So data reception at low bit rate with the feature of noise suppression also in absence of the receive signal is supported. Therefore, the transmitter has to send the code pattern either with positive polarity to generate a logical "1" at the latch output, or its inverted version to force the output of the latch to change to "0".

It will be appreciated that correlation unit 300, illustrated in FIG. 3a, is a non-limiting embodiment of the correlation unit provide herein. One of ordinary skill in the art will appreciate that changes may be made to the correlation unit of FIG. 3a without departing from the scope of the invention. For example, FIG. 4a illustrates an alternative embodiment of an ultra low power correlation unit 400, as provided herein, which implements a single decision threshold for elementary signal strength detection.

Figure 4:
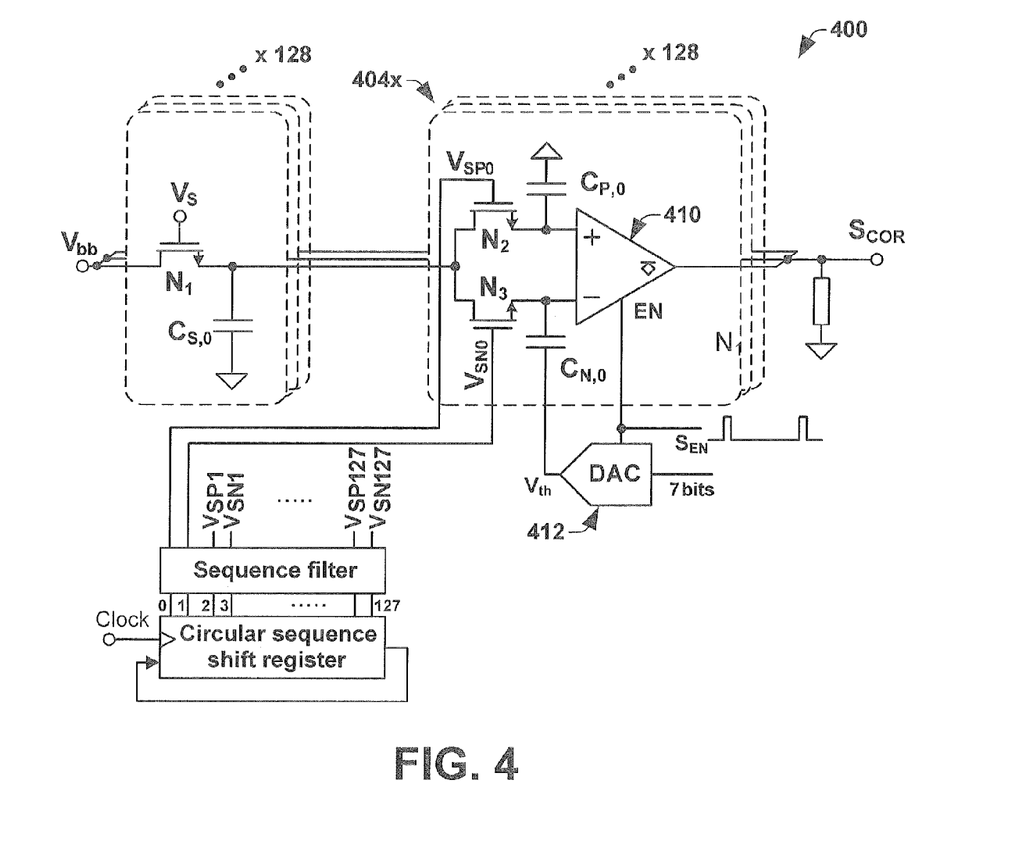
FIG. 4 illustrates an alternative embodiment of an ultra low power correlation unit.

As illustrated in FIG. 4, the correlation unit 400 comprises correlation stages 404x having a comparator 410 having a first input node coupled to the output of a first integration capacitor $C_{P,0}$ and a second input node coupled to the output of the second integration capacitor $C_{N,0}$. A digital-to-analog converter (DAC) 412 is coupled to capacitor $C_{N,0}$. During normal processing and integration of the sampled baseband signal according to the described algorithm, the negative voltage potential at $C_{N,0}$ is held at ground. However, during the short period for evaluation of the analog correlation signal (comparison of voltage difference of $C_{P,0}$ and $C_{N,0}$ with decision threshold $V_{th}$), the threshold voltage $V_{th}$ is applied at the DAC output. This way, the elementary comparator 410 with open drain output is utilized for generating the voltage difference between potentials of the integration capacitors $C_{P,0}$ and $C_{N,0}$ and simultaneously compares it with the positive decision threshold $+V_{th}$. The wired-OR output of all correlation stages 404x represents then the time domain sampled digital output that is illustrated below in FIG. 5b. In an alternative embodiment, DAC 412 may be coupled to capacitor $C_{P,0}$ (e.g., with an appropriately adjusted negative output value). As before, the comparator 410 may be heavily duty cycled if a high ratio between the integration capacitors $C_{P,0}$ and $C_{N,0}$ and the sampling capacitor $C_{S,0}$ is present.

Figure 5A:
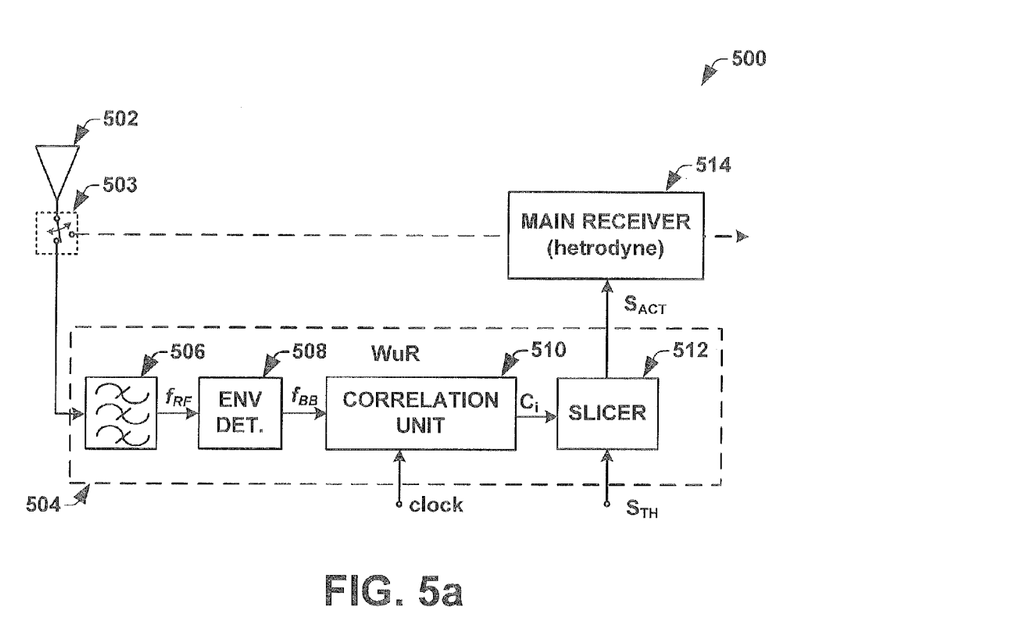
FIG. 5a illustrates a block diagram of a wake up receiver comprising an ultra low power correlation unit, as provided herein.

FIG. 5a illustrates a receiver unit 500 comprising an ultra-low power Wake-up Receiver (WuR) 504 having a low power correlation unit, as provided herein. It will be appreciated that although the proposed mixed-signal correlation unit may be used in an ultra-low power Wake-up Receiver (WuR), that it is not limited thereto. Rather the proposed correlation unit may also be used for other applications, such as RFID with low data rate output, for example. Furthermore, the architecture of the ultra-low power WuR may vary in different embodiments to comprise different or additional components such as filters, amplifiers, etc.

Referring to FIG. 5a, the proposed ultra-low power WuR 504 is coupled to an antenna 502 configured to receive an RF signal. If the WuR 504 detects a transmitted signal (e.g., data sequence) it is configured to generate an activation signal $S_{ACT}$ that turns on a main receiver 514, which is also coupled to the antenna 502 via an optional antenna switch 503. Once awakened, the main receiver 514 can conduct high data rate reception of the RF signal.

As provided herein, the WuR 504 operates at a low power by using passive filters and "old-fashioned" RF envelope detector demodulation technique for direct down conversion. For example, a passive SAW filter 506 is configured to receive the RF signal and generate a filtered signal that is provided to an RF envelope detector 508 configured to convert the RF signal to a baseband signal. The resulting signal-to-noise ratio (SNR) after RF to baseband conversion is comparably low. To enhance SNR and receive sensitivity after signal filtering and amplification, a low-power correlation unit 510 with preconfigured digital code sequence exploits high coding gain. After SNR enhancement by means of the correlation unit 510, a slicer 512 (with a Schmitt trigger characteristic) determines received bit via hard-decision. The slicer threshold $S_{TH}$ may be adjusted to provide suppression of frontend generated noise as well as configurable amount of immunity against interference. This way, data-bit evaluation is triggered if a certain receive signal strength is exceeded to guarantee low bit error ratio.

Figure 5B:
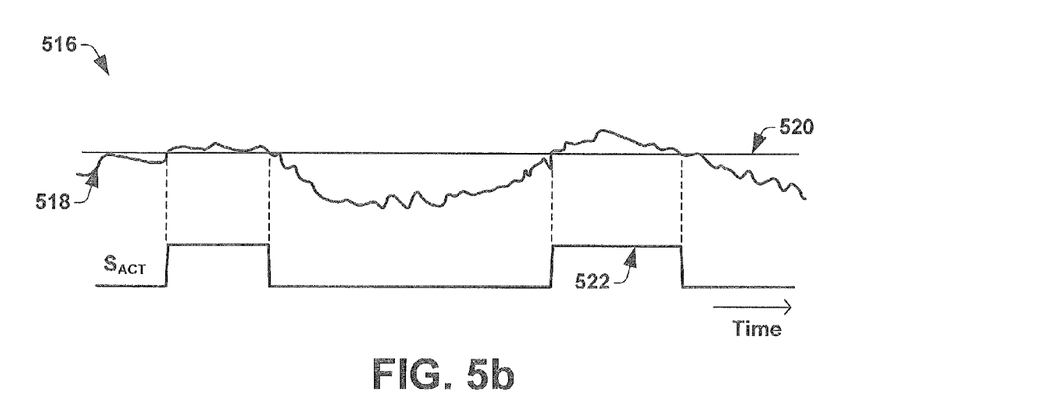

FIG. 5b illustrates a graph 516 of the correlated output signal 518 as a function of time. As shown in FIG. 5b, when the correlated output signal 518 does not violate a slicer threshold value 520 (e.g., is less than threshold value 520), the activation signal 522 is low, and the main receiver is in a sleep mode. However, when the correlated output signal 518 violates the slicer threshold value 520 (e.g., is greater than threshold value 520), the activation signal 522 is driven high, awakening the main receiver 514.

When implemented in a 130 nm CMOS technology the WuR may achieve a receive sensitivity of $-71$ dBm for a 7 ms correlation period with 64 bit pattern, 99% detection probability of wake-up events, and a residual noise-caused false wake-up rate of $10^{-3}$/s a power consumption of approximately 2.4 µW at 1.0V core voltage supply. Such a power consumption is significantly lower than that of other existing WuRs with comparably high sensitivity. Furthermore, the used 64-bit code sequences may be chosen to have appropriate cross-correlation properties with high circular orthogonality in order to support individual addressing of separate WuRs, so that address decoding is handled inherently by the correlation unit.

Figure 6:
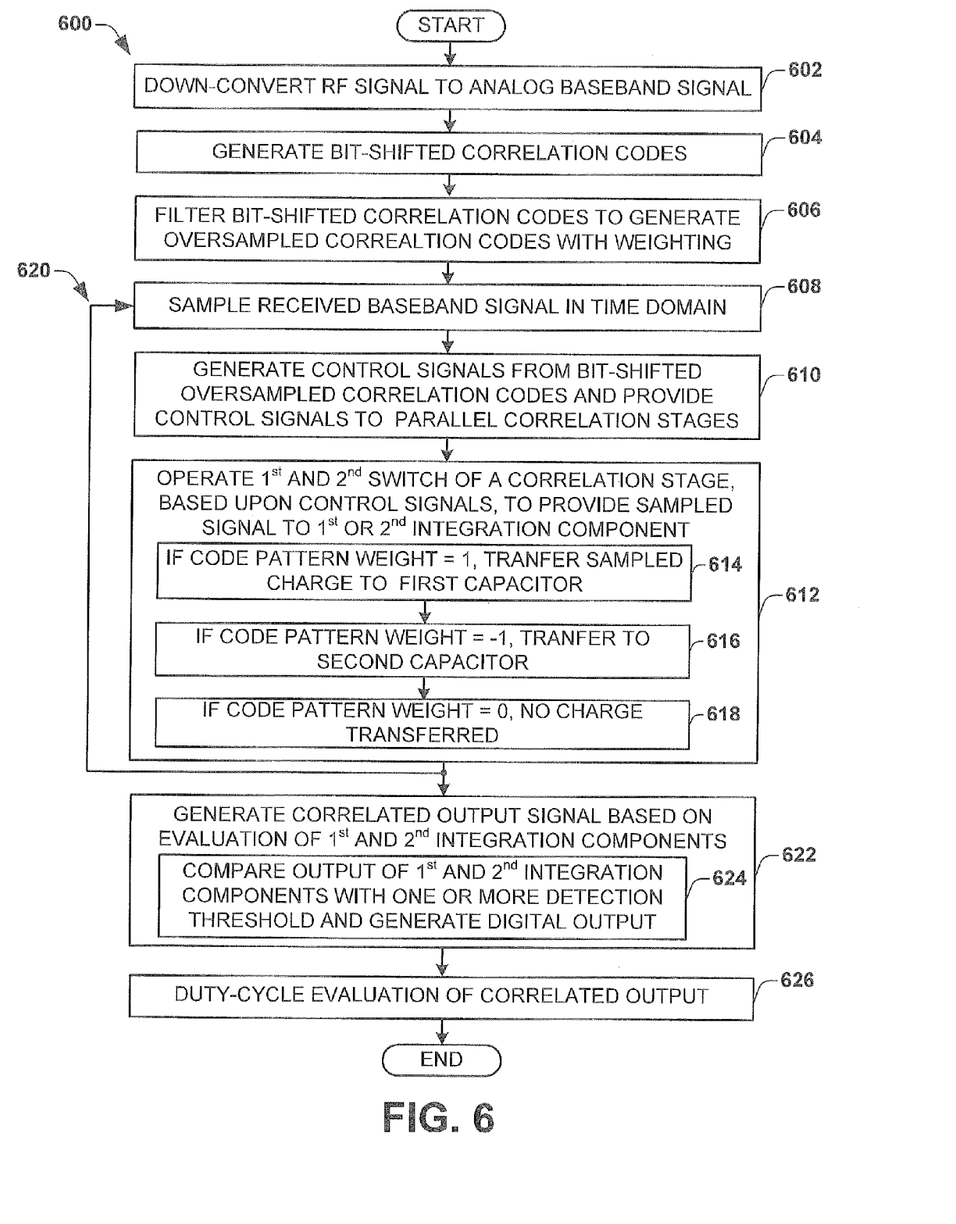
FIG. 6 illustrates a flow diagram of a method for performing an analog correlation scheme.

FIG. 6 illustrates a flow diagram 600 of a method for performing an analog correlation scheme. While the methods provided herein are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

Furthermore, the claimed subject matter may be implemented as a method, apparatus, or article of manufacture using standard programming and/or engineering techniques to produce software, firmware, hardware, or any combination thereof to control a computer to implement the disclosed subject matter (e.g., the circuits shown in FIGS. 1, 2, etc., are non-limiting examples of circuits that may be used to implement the method of FIG. 6). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At 602 an RF signal is down-converted to an analog baseband signal. In one embodiment, down-conversion may be performed using low power components such as passive filters and an RF envelope detector. The analog baseband signal contains its information within modulation of amplitude.

At 604 a one or more bit-shifted correlation codes are generated. In one embodiment, a bit-shifted correlation code is generated from a predetermined correlation code sequence based upon a clock signal. The predetermined correlation code sequence may comprise a 64-bit predetermined sequence of "1's" and "0's", which is stored in a circular pattern register, for example.

At 606 the bit-shifted correlation codes are filtered to generate bit shifted oversampled correlation codes having proper signal weighting. A bit-shifted oversampled correlation code (oversampled correlation code) is configured to have signal weighting that provides matched characteristics when compared to the baseband signal. For example, in one embodiment, the oversampled correlation code may comprise multiple values or polarities (e.g., +1, −1, and 0).

At 608 the analog baseband signal is sampled in the time domain. The analog baseband signal may be sampled using a switched capacitor, wherein a switch is selectively activated, to provide the baseband signal to a sampling capacitor that is configured to store a sample of the baseband signal when the switch allows for transmission of the signal.

At 610 control signals are generated from the bit-shifted oversampled correlation code and provided to a plurality of parallel correlation stages. The value of a bit-shifted oversampled correlation code, at a sampling clock period, corresponds to a control signal (e.g., "1" and "0") configured to operate a switch in a correlation stage. Control signals generated from an oversampled correlation code having a first bit shifted sequence may be provided to a first correlation stage, control signals generated from an oversampled correlation code having a second bit shifted sequence may be provided to a second correlation stage, etc.

At 612 the control signals operate a first and second switch of a correlation stage, to provide a sampled baseband signal to a first or second integration component within the correlation stage. For example, in one embodiment, if the oversampled correlation code has a first code pattern weight (e.g., +1), then control signals operate to transfer the sample charge to a first integration component comprising a first capacitor (step 614). If the oversampled correlation code has a second code pattern weight (e.g., −1), then control signals operate to transfer the sample charge to a second integration component comprising a second capacitor (step 616). If the oversampled correlation code has a third code pattern weight (e.g., 0), then control signals operate to no transfer the sample charge to either the first or second integration components (step 618).

In one embodiment, control signals generated from a particular oversampled correlation code may be periodically provided a plurality of correlation stages during a single sampling clock period, allowing for a smaller correlation code length to be used with a greater number of correlation stages (e.g., this allows for a 64-bit correlation code to be used with 128 stages of correlation).

At 620, control signals from particular oversampled correlation codes may be periodically provided to particular correlation stages. Periodically providing control signals (over several sampling clock periods) from a particular oversampled correlation code to a particular correlation stage between evaluations of the integration components (at step 622) allows processing multiple identical correlation code sequences consecutively, thereby increasing coding gain and allowing the output of the correlation unit to be duty cycled heavily (e.g., allowing the output to be evaluated once per M clock cycles). For example, if the 64-bit correlation code is transmitted twice consecutively and the ratio of integration capacitance to sampling capacitance is more than 128 (e.g., $C_{P,0}/C_{S,0} > 128$, $C_{N,0}/C_{S,0} > 128$) then coding gain of more than 128 may be achieved, thereby reducing noise power (noise amplitude would be reduced by the square root of 128).

At 622 a correlated output signal is generated based upon a comparison of the output of the first and second integration components. In one embodiment, at 624, an analog correlation result is evaluated by a comparison of the output of the integration components with one or two decision thresholds via one or two slicers to generate a digital output. While a single threshold allows detection of a certain signal strength with adjustable immunity against noise, a two threshold approach with opposite threshold polarity supports Schmitt trigger functionality and thus data reception at low data rate.

At 626, the circuitry used to perform the evaluation can be duty cycled according to correlation signal's bandwidth in order to save power.

It will be appreciated that method 600 may be periodically performed to generate a plurality of correlation signals of a wireless (RF) transmission between a transmitter and a receiver.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A correlation unit, comprising:
a control code source configured to output a plurality of control signals, generated based upon a predetermined correlation code sequence stored in a circular shift register;
a plurality of parallel correlation components, respectively configured to perform a parallel evaluation of a received baseband signal using the control signals, each correlation component comprises:
a sampling stage configured to sample the received baseband signal;
a correlation stage comprising two or more switched integrators, wherein the two or more switched integrators are selectively operated by the control signals to selectively receive and integrate the sampled baseband signal over a plurality of sampling clock periods to generate two or more voltage potentials; and
a comparison unit configured to receive the two or more voltage potentials from the switched integrators and to evaluate an analog correlation result therefrom.

2. The correlation unit of claim 1, wherein the control code source comprises a filter configured to generate oversampled correlation codes, respectively having a weighting that provides matched characteristics when compared to the baseband signal, and to further configured to generate the control signals based upon the oversampled correlation codes.

3. The correlation unit of claim 1,
wherein the sampling stage comprises a sampling switch located upstream of a sampling capacitor;
wherein the correlation stage comprises a first switch coupled to a first integration capacitor and second switch coupled to a second integration capacitor; and
wherein a ratio of the first integration capacitor to the sampling capacitor is greater than or equal to the length of the predetermined correlation code sequence and a ratio of the second integration capacitor to the sampling capacitor is greater than or equal to the length of predetermined correlation code sequence.

4. The correlation unit of claim 3, wherein the control code source is configured to periodically provide control signals generated from a particular correlation code sequence to a particular correlation stage between evaluations of the analog correlation result, thereby accumulating a large number of baseband signal samples at the switched integrators.

5. The correlation unit of claim 4, further comprising a control unit configured to generate an enable signal that activates the comparison unit at a low duty cycle in order to reduce power consumption.

6. The correlation unit of claim 1, wherein the plurality of control signals selectively operate the two or more switched integrators, depending on values of a bit shifted version of the predetermined correlation code sequence, to receive and integrate the sampled baseband signals.

7. A correlation unit, comprising:
a plurality of sampling stages, respectively configured to sample a received baseband signal;
a plurality of correlation stages located downstream of the sampling stages and respectively comprising:
a first switched integrator comprising a first switch coupled to a first integration capacitor;
a second switched integrator comprising a second switch coupled to a second integration capacitor;
a control code source configured to generate control signals associated with each correlation stage based upon bit-shifted versions of a predetermined correlation code sequence, wherein the control signals associated with each correlation stage selectively open and close the first and second switches of the first and second switched integrators, respectively, depending on values of the bit-shifted correlation code, thereby selectively providing the sampled baseband signal to the first and second integration capacitors to accumulate first and second voltage potentials, respectively, over a plurality of sampling clock periods; and
a plurality of comparison units configured to receive the first and second voltage potentials within respective correlation stages and to evaluate an analog correlation result therefrom.

8. The correlation unit of claim 7, wherein the control code source comprises:
a circular shift register configured to generate the bit-shifted correlation code sequences from the predetermined correlation code sequence; and
a matched filter configured to filter the bit-shifted correlation code sequences to generate oversampled correlation codes having a weighting that provides matched characteristics when compared to the baseband signal and to further configured to generate the control signals based upon the oversampled correlation codes.

9. The correlation unit of claim 8, wherein the control code source is configured to periodically provide control signals generated from a particular bit-shifted correlation code sequence to a particular correlation stage between evaluations of the analog correlation result, thereby accumulating a large number of baseband signal samples at the first and second switched integrators.

10. The correlation unit of claim 8, wherein the control code source is configured to periodically provide control signals generated from a particular bit-shifted correlation code sequence to a plurality of correlation stages during a particular sampling clock period, thereby operating a number of correlation stages which is larger than the length of the predetermined correlation code sequence.

11. The correlation unit of claim 8, wherein respective sampling stages comprise a sampling switch located upstream of a sampling capacitor.

12. The correlation unit of claim 11,
wherein if the value of a particular oversampled correlation code is equal to a first pattern weight then no charge is transferred from the sampling capacitor to the integration capacitors;
wherein if the value of the particular oversampled correlation code is equal to a second pattern weight then charge is transferred from the sampling capacitor to the first integration capacitor; and
wherein if the value of the particular oversampled correlation code is equal to a third pattern weight then charge is transferred from the sampling capacitor to the second integration capacitor.

13. The correlation unit of claim 11, wherein a ratio of the first integration capacitor to the sampling capacitor is greater or equal to the length of the predetermined correlation code sequence and a ratio of the second integration capacitor to the sampling capacitor is greater or equal to the length of the predetermined correlation code sequence.

14. The correlation unit of claim 13, further comprising a control unit configured to generate an enable signal that activates the comparison units at a low duty cycle in order to reduce power consumption.

15. The correlation unit of claim 14,
wherein respective comparison units comprise:
   an summation node coupled to the output of the first integration capacitor and the output of the second integration capacitor and configured to generate a voltage difference therebetween;
   a first comparator having a first input node coupled to the summation node and a second input node coupled to a digital-to-analog converter configured to provide a positive threshold value to the first comparator; and
   a second comparator having a first input node coupled to the summation node and a second input node coupled to the digital-to-analog converter configured to provide a negative threshold value to the second comparator;
wherein the outputs of first comparators of respective comparison units are connected as a first logical OR connection and wherein the outputs of second comparators of respective comparison units are connected as a second logical OR connection; and
wherein an RS latch is configured to receive an analog correlation result having a Schmitt trigger characteristic from the first and second logical OR connections, which toggles a correlated output signal output from the RS latch if the RS latch is enabled and a sufficient signal strength is received by at least one correlation stage.

16. A method of performing an analog correlation method, comprising:
   down-converting an RF signal to an analog baseband signal;
   generating a plurality of bit-shifted correlation code sequences from a predetermined correlation code sequence;
   sampling the analog baseband signal in the time domain;
   selectively operating switches within a plurality of parallel correlation stages, based upon a value of the bit-shifted correlation code sequence during a sampling clock period, to selectively provide the sampled baseband signal via the selectively operated switches to either a first integration component or a second integration component within the correlation stages;
   and generating a correlated output signal based upon an evaluation of an analog correlation result based upon outputs of the first and second integration components.

17. The method of claim 16,
   filtering the plurality of bit-shifted correlation code sequences to generate oversampled correlation codes having weightings that provide for matched characteristics when compared to the analog baseband signal;
   generating control signals based upon the oversampled correlation codes; and
   providing the control signals to the switches.

18. The method of claim 17, further comprising periodically providing the control signals generated from a particular bit-shifted correlation code sequence to switches within a particular correlation stage between evaluations of the outputs of the first and second integration components, thereby accumulating a large number of baseband signal samples at the first and second integration components.

19. The method of claim 17, further comprising periodically providing the control signals generated from a particular bit-shifted correlation code sequence to a plurality of correlation stages during a particular sampling clock period, thereby operating a number of correlation stages which is larger than the length of the predetermined correlation code sequence.

20. The method of claim 17,
   wherein the analog baseband signal samples are stored in a sampling capacitance,
   wherein the integration components comprise integration capacitances, and
   wherein a ratio of the integration capacitances to the sampling capacitance has a value greater than or equal to the length of the predetermined code sequence in order to enhance coding gain over correlation code sequence length for periodically and consecutively transmitted code sequences.

* * * * *